Aug. 12, 1941.　　　R. FRENCH　　　2,252,070
CURTAIN AND THE LIKE AND MEANS FOR SUSPENDING SAME
Filed Aug. 17, 1938　　　4 Sheets-Sheet 4

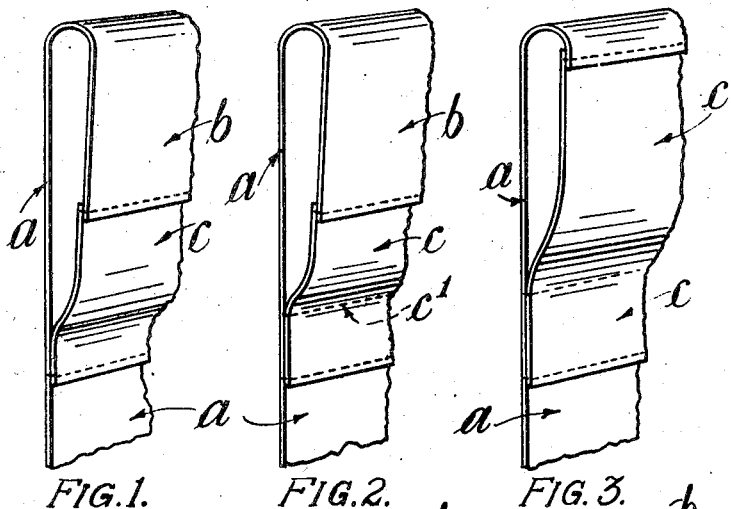

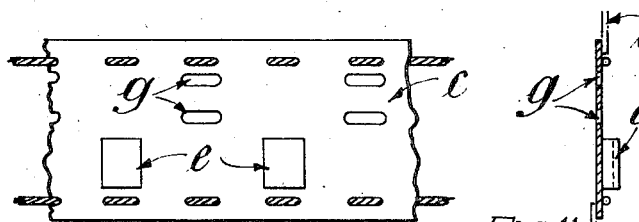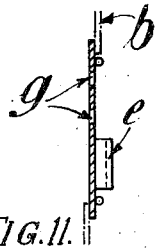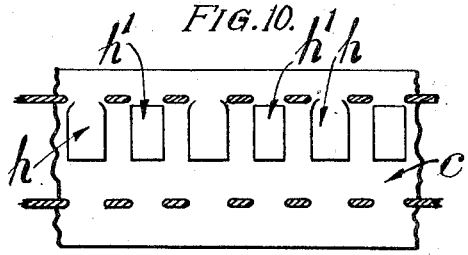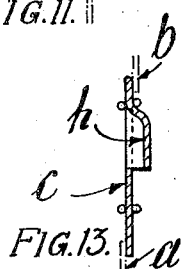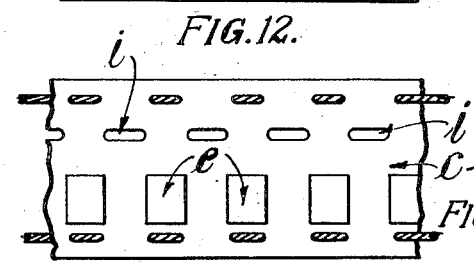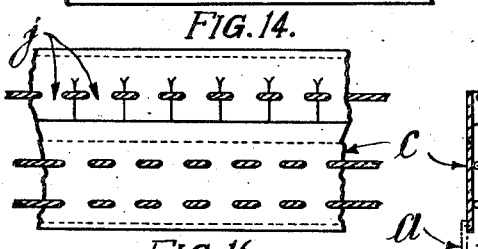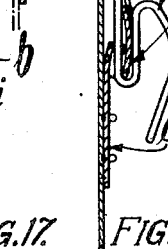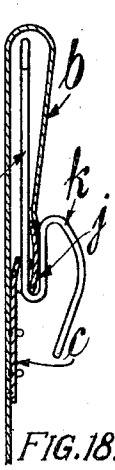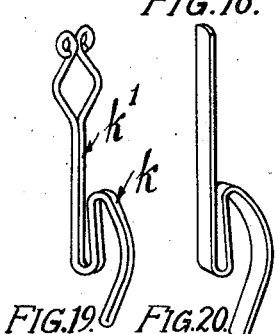

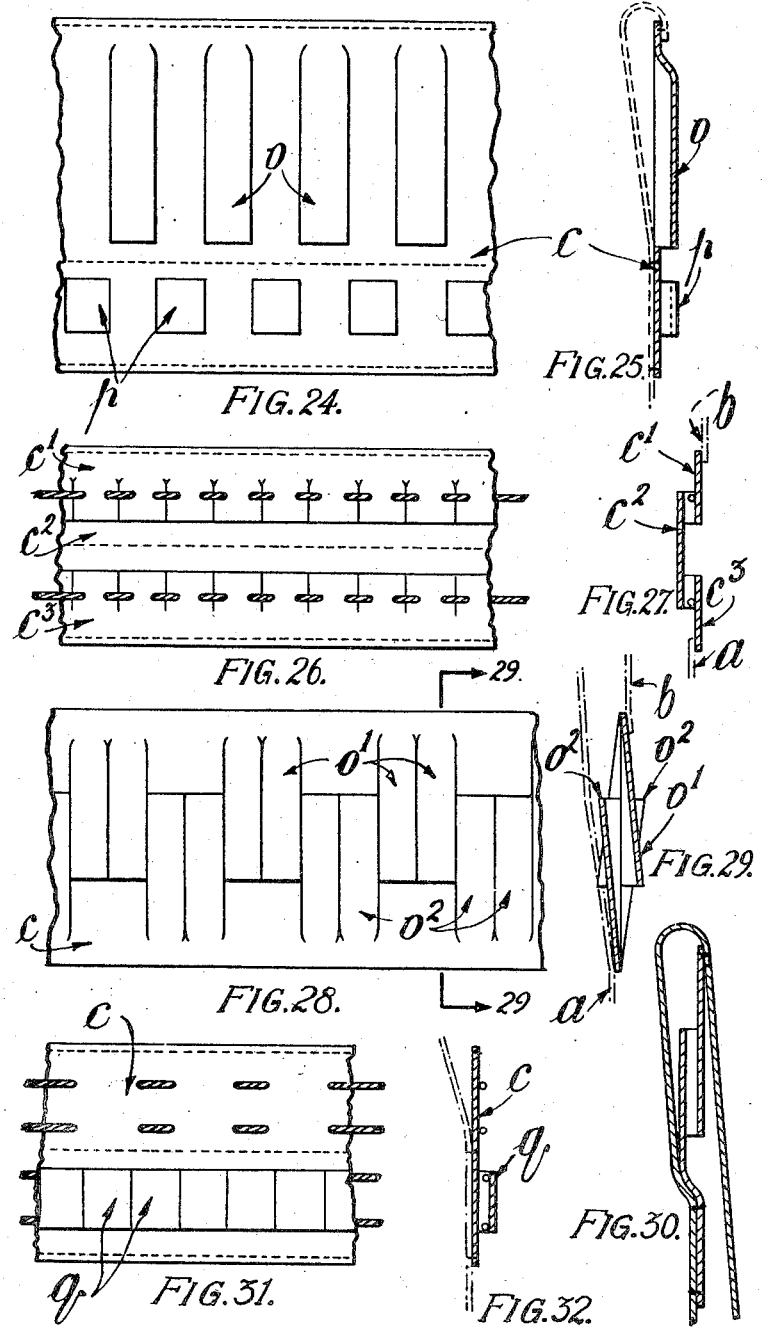

Inventor:
Roger French
By his Attorney: Walter Gunn

Patented Aug. 12, 1941

2,252,070

UNITED STATES PATENT OFFICE 2,252,070

CURTAIN AND THE LIKE AND MEANS FOR SUSPENDING SAME

Roger French, Manchester, England

Application August 17, 1938, Serial No. 225,265
In Great Britain August 20, 1937

8 Claims. (Cl. 156—10)

In the formation of the heading part of a curtain it is usual to fold down a short portion of the top part of the curtain fabric, and then secure the edge of the folded-down part to the curtain proper, a length of narrow tape being placed over the said edge part to cover the join and give a neat finish thereto. The upper edge of the tape is sewn to the said folded-down part, and the stitches pass through three thicknesses of material, or if a hem is formed along the edge of the curtain fabric, through four thicknesses, whilst the lower edge of the tape is sewn to the main or body part of the curtain, where the stitches have to pass through two thicknesses.

With such formation of heading, and for the purpose of facilitating easy suspension of the curtain, it is usual to provide a heading tape having on its front face "hook tubes" or loops, i. e. short straps joined at each end to the tape, which permit of suspension hooks being used adapted to engage the "hook tubes" or loops, the hooks passing up through each "hook tube" or loop at the bottom, and emerging at the top on the same side of the tape. Usually the heading tape is also provided with draw cords, for enabling the curtain and tape to be pleated.

With such known formation of curtain heading and known heading tape, there are several drawbacks. First, the formation of the heading is somewhat slow and liable to be inaccurate; secondly, it does not allow of even vertical pleating of the heading, i. e., pleating which extends throughout the full height or depth of the heading, and thirdly, the heading is liable to sag or hang over above the points of suspension unless supported by hooks with long upper extensions, passing up in front of, and sewn at their top ends to the heading. Tapes with holes in them for allowing the hooks to pass through and behind the tapes have been proposed, but owing to the upper row of stitching are not capable of passing into the heading. It may here be pointed out that it was owing to such drawback, i. e. the hooks meeting the upper row of stitching, that the open-ended "hook tubes" were proposed, which allow the hooks to extend upwards to any height but outside the heading.

The main objects of this invention are first to form the heading of a curtain or the like, composed of a length of heading tape in addition to the curtain material, in a manner that facilitates the easy, quick and accurate formation of the heading, and secondly, to provide a construction of heading tape which permits of the use of suspension hooks, parts of which will pass through and behind the heading tape without obstruction of the upper row of stitching, and, extending into the heading, serve to hold the heading erect. A further object is a construction of heading, and the application of a pleating tape thereto which allows of more even pleating, and pleating which extends throughout the depth of the heading.

According to the first part of the invention, the heading tape is sewn to the curtain proper so as to form an integral part of the heading, and either as a portion of one side of the heading, or as the whole or major part of one side, one (the upper) edge of the tape being in no way directly connected to the main or body part of the curtain.

In one example of the invention, the lower edge or part of the tape is sewn to the body part of the curtain, and the upper edge of the tape is sewn to the edge only of the folded-down part of the curtain, and not to the body part of the curtain. In another example, the tape is sewn along its lower edge, and along a point (or points) about the middle of its width, or slightly below such middle part to the body part of the curtain, and along its upper edge is sewn to the edge of the folded-down part of the curtain, and not to the body part of the curtain.

In a further example, the tape, made to a wider width, is sewn along its lower part to the body portion of the curtain as in example one or two, and along its upper edge is sewn to the extreme top part of the curtain.

In each example, the sewing will be through two thicknesses only, unless the edge of the curtain is hemmed to avoid a raw edge, when there will be at most three thicknesses. In all cases, the top edge of the tape will not be sewn to the body part of the curtain, i. e. to any part of the curtain below the top of the heading, and thus allow of more even and vertical pleating when the tape is provided with drawcords for pleating purposes.

According to the second part of the invention, the tape is formed with hook-tubes, or openings, at uniform intervals, and close together, or otherwise, throughout its length, which open on to the opposite sides of the tape, and thereby allow of the long vertical stem parts of curtain hooks or stiffeners to pass through the tape and up into the heading, and thereby hold the heading erect, without any sewing of the hooks or stiffeners to the heading. In the case of heading tape extending from the top edge of the curtain, and forming the whole, or major portion of one side of the heading, the hook-tubes may extend to the top edge of the tape and be closed at their top ends, in which case the hook stems will hold the heading erect by fitting the hook-tubes almost to the top ends. In addition to the aforesaid hook-tubes or openings, the tape may be provided at spaced intervals with ordinary hook-tubes opening top and bottom on to the same side of the tape for allowing of ordinary "turn-over" hooks being used, in addition to the aforesaid hooks with long stem parts, or for allowing of the said stem parts passing first through an ordinary hook-tube and then through one of the hook-tubes opening on to both sides of the tape, or closed at the top end.

In addition to the suspension hooks or stiffeners being used to support the curtain, or hold the heading erect, they may be used to hold the folded-down part of the curtain and the top of the tape in the required positions for forming the heading.

When the tape and heading require to be pleated, the tape will be provided with one or more drawcords.

The invention will now be described with reference to the accompanying drawings, wherein:

Fig. 1 is a front perspective view of one example of the improved curtain or like heading.

Fig. 2 is a like view of a further example, and

Fig. 3 is a similar view of a third example.

Fig. 4 is a geometric face view, and

Fig. 5 is a cross section of a portion of one example of heading tape suitable for carrying out the second part of the invention.

Figs. 6 and 7 are like views of a portion of another example of such tape.

Figs. 8 and 9, 10 and 11, 12 and 13, and 14 and 15 are face and sectional views respectively of portions of further examples of tape.

Figs. 16 and 17 are face and sectional views of a portion of an example of tape mainly suitable for use with the form of heading shown in Figs. 2 and 3.

Fig. 18 is a further cross section of Fig. 16 and shows the application of a hook thereto having a part adapted to extend up into the heading and hold it erect.

Fig. 19 shows the same hook separately from the heading.

Figs. 20 and 21 are perspective views of two further examples of hooks suitable for use with the improved heading.

Fig. 22 is a perspective face view of a heading support (stiffener) as distinct from a hook, the prongs of the support (stiffener) being designed to pass through two side-by-side hook-tubes and grip the intermediate parts of the tubes.

Fig. 23 is a side view of a combined curtain ring and hook.

Fig. 24 is a face view, and Fig. 25 a cross section of another example of the tape.

Fig. 26 is a face view, and

Fig. 27 a cross section of a portion of a tape made so as to allow of being applied either way up.

Fig. 28 is a face view, and

Fig. 29 is a cross section, on line 29—29 of Fig. 28, of a portion of another example of a reversible tape, i. e. adapted to be applied any way up, either side.

Fig. 30 is a cross section of tape with the hook-tubes on the inner face of the tape, i. e., next the curtain.

Figs. 31, 32, and 33 and 34 are face and sectional views respectively of portions of two further examples of the tape.

Figure 35:
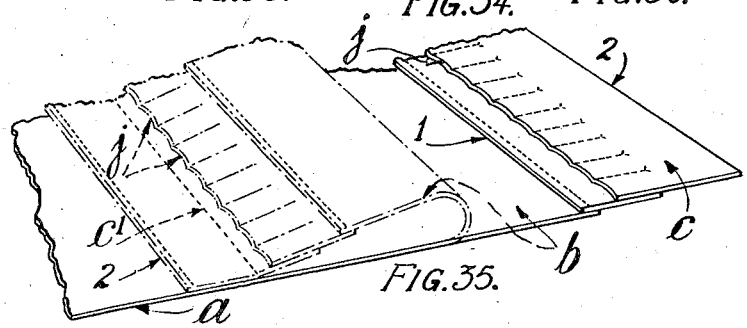

Fig. 35 is a perspective view of a curtain prior to the top part being folded down or over to form the heading, and of the heading tape (Fig. 16) with one edge laid over the edge of the curtain material prior to and after sewing the same thereto, the dotted lines showing the curtain after being folded over, and also showing the tape in position for its other or lower edge to be sewn to the body part of the curtain.

Figures 33, 34, 36:
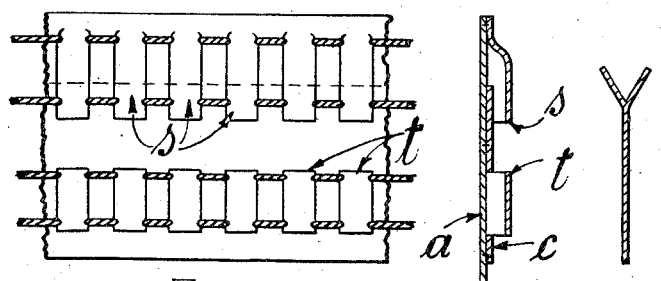

Fig. 36 is a cross section of the upper edge part of the tape bifurcated to allow it to embrace the edge of the folded-down part of the curtain and give a neat finish thereto.

Figures 37, 38, 42:
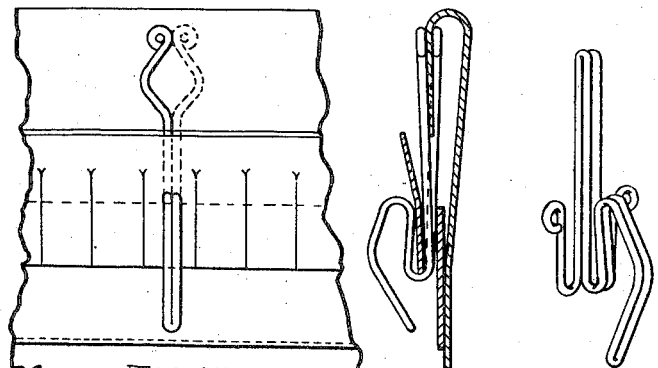

Fig. 37 is a face view, and

Fig. 38 is a cross section of a portion of a heading constructed according to a further example.

Figures 39, 40, 41:
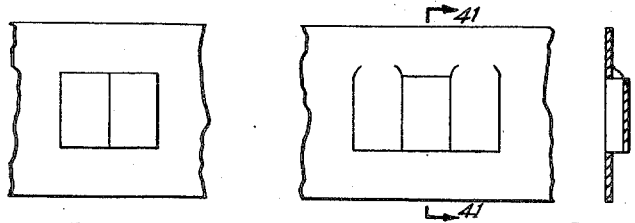

Fig. 39 is a face view of a portion of tape made according to a further example.

Fig. 40 is a face view, and

Fig. 41 is a cross section of a portion of still another example of the tape.

Fig. 42 is a front perspective view of a hook suitable for use with the tape shown in Figs. 40 and 41.

In Fig. 1 $a$ is the main part of the curtain, and $b$ the folded-down upper part of the curtain material. $c$ is the heading tape secured (sewn) to the edge of the folded-down curtain material $b$ along one edge, and secured (sewn) to the main part of the curtain $a$ along its other edge, the tape $c$, the folded-down part $b$ and a portion of the main part $a$ of the curtain collectively forming the heading.

In Fig. 2 $a$ is the main part of the curtain and $b$ the folded-down upper part of the curtain. $c$ is the heading tape, but instead of being secured (sewn) to the curtain along its upper and lower edges only, it is also secured (sewn) to the body part of the curtain at a point $c^1$ intermediate of such edges, and for such reason will preferably be slightly wider than the heading tape shown in Fig. 1.

In Fig. 3 $a$ is the curtain but having no folded-down part or only a small folded-down part at its upper edge, to avoid leaving a raw or uneven edge. The heading tape $c$ is secured (sewn) along one edge to the said upper edge of the curtain and to the body part of the curtain along its lower edge and also, if desired, at a point away from such lower edge, the tape then forming one side of the curtain heading.

In each example, the tape $c$ may have drawcords, or be without drawcords. It may also be plain and adapted for suspension by means of sew-on rings. Usually, however, it will be formed with hook-tubes, slots or eyelets spaced at suitable distances apart and adapted to allow of being directly suspended by suspension hooks. Some or all of the hook-tubes will open on to both sides of the tape and some may open only top and bottom on the same side of the tape.

In Fig. 4 the tape is shown provided with a row of side-by-side hook-tubes $d$, the tape being formed as two thicknesses joined to each other at intervals, and the edges of one thickness lying below those of the other thickness (stepped), and the two thicknesses collectively providing the hook-tubes $d$ for the passage of the suspension hooks into the interior of the curtain heading. The tape is secured by its edge 1 to the edge of the folded-down part $l$ of the curtain material and by its edge 2 to the main part $a$ of the curtain, see Figs. 2 and 35.

In Figs. 6 and 7, the tape is provided with a central row of slits or eyelet holes, and is applied to the curtain in like manner to the tape shown in Fig. 4.

In Figs. 8 and 9 the tape is formed with hook-tubes $e$, $e$, and behind each hook-tube strap the tape proper is formed with a slot or opening $f$. This make of tape allows of a suspension hook passing through the hook-tube and via the opening to the rear of the tape, and, therefore, into the curtain heading. It also allows of ordinary suspension hooks being used, which engage only the front strap of the hook-tube.

In Figs. 10 and 11 the tape is formed with like open-backed hook-tubes e, e, in its lower part, and with pairs of slits or openings g, g in its upper part, whereby hooks with long stems may enter the heading via the hook-tubes, and the usual "turn-over" or like hooks may engage the pairs of openings g, g, or vice versa.

In Figs. 12 and 13 the tape is formed with hook-tubes h, h in its upper part, each hook-tube at its lower end opening on to the front side of the tape, and at its upper end being closed on the front side, but opening on the rear side of the tape. Intermediate of the hook-tubes h are ordinary open-ended hook-tubes $h^1$, for ordinary hooks to engage.

In Figs. 14 and 15 the tape is formed with slits or openings i in its upper part, and hook-tubes e in its lower part, these latter being either open-backed as in Figs. 9 and 11, or merely open top and bottom.

In Figs. 16 and 17, the tape is of like construction to the tape shown in Figs. 4 and 5, being composed of two thicknesses and one thickness stepped in relation to the other. In this example, however, the lower thickness is wider than the upper thickness, and the hook-tubes j are formed near to the upper edge of the tape, whilst the lower and wider part of the tape is left plain, except for the drawcords when these are provided. In this latter connection, in order to cause the hook-tube straps to stand away from the tape proper and thus facilitate insertion of the hooks, the drawcords may be applied to both the upper and lower parts of the tape, and in a manner such that on pleating the tape, the hook-tubes in the upper part of the tape will lie opposite the pleat channels of such part, and in line with the pleat channels of the lower part, the cords in the upper part passing through and behind each hook-tube strap, and the cords in the lower part passing in front of the tape at points directly opposite the hook-tube straps. This example of tape allows of very effective pleating of the tape throughout its full width or depth, and in addition, helps to give continuity and uprightness to the pleats of the heading as a whole. This example of tape also allows of being secured to the curtain along its two edges, and also at a point in its width as in Fig. 2. In Fig. 18, this example of tape is shown applied to a curtain and the same view shows the application thereto of a suspension hook k having an upwardly extending rear stem part $k^1$, which may be threaded through any of the hook-tubes and pass into the interior of the heading, where it reaches to the upper fold of the heading and serves to prevent the heading sagging or falling over. The hook may be of any desired construction, but that shown is composed of a length of wire folded upon itself and also bent to form the hook proper, and at the top end of the stem part shaped as shown in Fig. 19. With the hook-tubes arranged side-by-side (Fig. 4), the hook is adapted to engage any two hook-tubes and grip the intervening walls of the hook-tubes, also grip the front straps of the hook-tubes between its front and rear parts, and thereby prevent accidental falling out.

In Fig. 20, the hook shown is made of flat strip metal, folded upon itself to provide the front hook part and the rear vertical stem part. In Fig. 21 the hook shown is made of wire, folded to form the front hook part and the rear vertical stem part, this latter being flattened at its top end. In each example of hook, the same is formed so as to also grip the front wall of the hook-tube. Instead of being made of strip metal, the hook shown in Fig. 20 may be made of wire.

In addition to the hooks for supporting the curtain, wire stiffeners or supports n, see, for example, Fig. 22, may be provided, these passing up through the hook-tubes and at their upper ends extending into the heading for the purpose of holding the heading erect, and at their lower parts gripping the front wall of the hook-tubes. Instead of using hooks, curtain rings m with vertical stem parts n may be used. See Fig. 23. In this case also, the front part of the hook-tube is gripped between the ring and stem parts after being applied to the tape.

In Figs. 24 and 25, the tape is formed with long hook-tubes o in the upper part of the tape and short hook-tubes p in the lower part, the former opening on to the rear side of the tape and the latter opening at both ends on the same front side of the tape. The hook-tubes o and p may be in line with each other, or they may be staggered, as shown. When in line a hook with long stem part may engage both hook-tubes, but when not in line, a hook with long stem part may engage each hook-tube o, and an ordinary short hook engage each hook-tube p. Of course, the lower row of hook-tubes may be omitted.

In Figs. 26 and 27, the tape shown is composed of three thicknesses $c1$, $c2$, $c3$, joined at intervals by vertical connections to produce open-ended hook-tube passages through the tape, the arrangement of the thicknesses and passages allowing of the tape being applied either way up on one side between the folded down part (or upper edge) of the curtain and the main part of the curtain.

In Figs. 28 and 29, a similar make of tape is shown but with the thicknesses arranged so that the tape may be applied any way up on either side, and still allow the hooks to pass into the curtain heading. In this construction of tape alternate pairs of hook-tubes, $o^1$, $o^2$, open at their upper ends on to the rear side of the tape and at their lower ends open on to the front side of the tape, whilst the intermediate pairs of hook-tubes open at their top ends onto the front side of the tape and at their lower ends open on to the rear side of the tape, the two thicknesses of the tape forming the strap portions of the hook-tubes and the tape proper being woven and united to suit.

In Fig. 30 the tape is formed so to have the hook-tube passages on the inner face of the tape. In the case of a heading made according to Fig. 3, the top part of the curtain may extend down in front of the heading to form a valance as shown in Fig. 30.

In Figs. 31 and 32, a row of side-by-side ordinary hook-tubes q is applied to the lower part of the tape, and drawcords r, r are applied to both the lower and upper part.

In Figs. 33 and 34, a row of hook-tubes s open at their lower ends, but closed at their upper ends, is applied to the upper part of the tape, also drawcords, and a row of ordinary hook-tubes t (opening on to the front side of the tape, top and bottom) is applied to the lower part of the tape, this construction of tape being mainly useful with the construction of hook shown in Fig. 20.

The invention is equally applicable to curtain valances, portiere rod curtains and the like.

As shown in Fig. 36, the top part of the tape may be bifurcated and serve to enclose the raw edge of the top part of the curtain.

As shown in Figs. 37 and 38, the folded-down part of the curtain may be secured in position relatively to the top part of the curtain by means of the suspension hooks (Fig. 19), or by means of the stiffeners (Fig. 22) the stems of the hooks, or stiffeners, after passing through the tape, gripping the lower edge part of the folded-down portion of the curtain. Instead of the twin thicknesses of wire lying in a plane parallel with the tape, they may lie in a plane at right angles thereto, in order the better to grip the curtain material.

In Fig. 39 the tape is shown with twin side-by-side hook-tubes, with openings in the tape behind the hook-tubes or otherwise, according as the hooks require to pass into the heading, or in front of the heading.

In Figs. 40 and 41 the tape is formed with groups of three side-by-side hook-tubes and with an opening in the tape behind the central hook-tube, so that on application of a hook like that shown in Fig. 42 the stem part may pass up the central hook-tube into the heading via the opening in the tape, whilst the lateral group of the hooks may engage the two outer hook-tubes from their lower open ends. Alternatively an ordinary twin-over hook with lateral prongs may engage all three hook-tubes from their lower ends and extend through their upper ends in front of the tape.

The improved heading is not limited to any particular make of tape, or arrangement of hook-tubes or openings in the tape, and it must be understood that any make of tape having hook-tubes, loops or openings may be employed allowing of the use of suspension hooks in the manner described.

By using the tape to form part of one side, or the whole or major part of one side of the curtain heading, a saving of curtain material is effected, and by using the tape to form part of the heading, and hooks to engage the heading up to its upper edge, the curtain heading is more effectually held erect. By there being only two thicknesses of material sewn together except in the case of a raw selvedge, where the tape is joined to the curtain, it will be appreciated that the pleating will be more uniform and pronounced throughout the whole depth of the heading than when three or four thicknesses are joined together, especially along the top edge of the tape. Also, by connecting the tape along its central part, as well as along its edges, the pleating of the tape ensures more pleasing and even pleating of the curtain, especially in the case of the tape extending to the top of the heading (Fig. 3) and with the rear stem parts of the hooks and stiffeners lying within the heading they are concealed from view.

What I claim is:

1. In a curtain having the upper edge thereof folded over on itself for a substantial distance along substantially the entire width thereof, a relatively narrow strip of tape having its upper edge stitched to said folded edge only of said curtain, the lower edge of said tape being stitched to the body only of said curtain along its width, said tape and folded portion in combination constituting a curtain heading providing a free pocket from the top of said curtain to the lower edge of said tape, the improvement which comprises at least one series of hook-tubes in said tape, the lower ends of said tubes adapted to open to the outside of said pocket and the upper ends adapted to open to the inside of said pocket.

2. In a curtain having the upper edge thereof folded over on itself for a substantial distance along substantially the entire width thereof, a relatively narrow strip of tape having its upper edge stitched to said folded edge only of said curtain, the lower edge of said tape being stitched to the body only of said curtain along its width, said tape and folded portion in combination constituting a curtain heading providing a free pocket from the top of said curtain to the lower edge of said tape, the improvement which comprises at least one series of hook-tubes in said tape, the lower ends of said tubes adapted to open to the outside of said pocket and the upper ends adapted to open to the inside of said pocket and a drawcord in said pocket.

3. In a curtain having the upper edge thereof folded over on itself for a substantial distance along substantially the entire width thereof, a relatively narrow strip of tape having its upper edge stitched to said folded edge only of said curtain, the lower edge of said tape being stitched to the body only of said curtain along its width, said tape and folded portion in combination constituting a curtain heading providing a free pocket from the top of said curtain to the lower edge of said tape, the improvement which comprises at least one series of hook-tubes in said tape, the lower ends of said tubes adapted to open to the outside of said pocket and the upper ends adapted to open to both the outside and the inside of said pocket.

4. A structure as claimed in claim 1, wherein the tape has an additional row of hook-tubes below the aforesaid hook-tubes, the latter hook-tubes opening on the front side of said tape.

5. A structure as claimed in claim 1, wherein the tape has an additional row of hook-tubes below the aforesaid hook-tubes, the latter hook-tubes opening on the front side of said tape, the hook-tubes of each row being spaced apart and the hook-tubes of the lower row being in alinement with the spaces between the tubes of the upper row.

6. A structure as claimed in claim 1 wherein the tape is formed with through hook-tubes by making the tape of two thicknesses, and one thickness lying in stepped relationship to the other, the two thicknesses being united vertically at intervals to form the hook-tubes, as herein set forth.

7. A structure as claimed in claim 1 wherein the tape is provided with hook-tubes, opening on to opposite sides of the tape, the tape being formed of three thicknesses lying in stepped relationship, the upper and lower being in alignment, the central thickness overlapping the others and being secured at intervals thereto to form the hook-tubes, as herein set forth.

8. A structure as claimed in claim 1 wherein the tape is formed with hook-tubes opening on to opposite sides of the tape, and certain of them being arranged with their upper ends opening on to one side of the tape, and certain others opening at their upper ends on to the other side, and thereby allowing of the tape being applied with either side edge up, as herein set forth.

ROGER FRENCH.